United States Patent
Stastny et al.

(10) Patent No.: US 8,422,738 B1
(45) Date of Patent: Apr. 16, 2013

(54) ADAPTIVE AUTOMATED SYNTHETIC APERTURE RADAR VESSEL DETECTION METHOD WITH FALSE ALARM MITIGATION

(75) Inventors: John C. Stastny, San Diego, CA (US); Michael R. Hughes, San Diego, CA (US); Keith Pifko, Philadelphia, PA (US); Daniel Garcia, San Diego, CA (US); Bryan Bagnall, San Diego, CA (US); Heidi Buck, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 232 days.

(21) Appl. No.: 13/032,712

(22) Filed: Feb. 23, 2011

Related U.S. Application Data

(63) Continuation-in-part of application No. 12/197,421, filed on Aug. 25, 2008, now Pat. No. 8,116,522.

(51) Int. Cl.
*G06K 9/00* (2006.01)

(52) U.S. Cl.
USPC ........................................................ 382/103

(58) Field of Classification Search .................. 382/103; 342/20, 25 B, 27, 90; 348/169
See application file for complete search history.

(56) References Cited

U.S. PATENT DOCUMENTS

| | | | |
|---|---|---|---|
| 4,101,891 A * | 7/1978 | Fletcher et al. ............. | 342/25 A |
| 5,402,131 A | 3/1995 | Pierce | |
| 5,633,644 A | 5/1997 | Schussler et al. | |
| 6,259,396 B1 * | 7/2001 | Pham et al. ...................... | 342/90 |
| 8,330,647 B2 * | 12/2012 | Fox et al. ......................... | 342/91 |
| 8,334,799 B2 * | 12/2012 | Barbaresco ................. | 342/26 R |
| 2007/0269078 A1 * | 11/2007 | Lee ................................ | 382/103 |
| 2008/0063237 A1 * | 3/2008 | Rubenstein .................... | 382/103 |
| 2009/0316953 A1 * | 12/2009 | Ezekiel et al. ................. | 382/103 |

OTHER PUBLICATIONS

Hajduch et al ("Ship detection on ENVISAT ASAR data: results, limitations and perspectives", Proceedings of SEASAR, earth.esa.in, 2006).*
Paris ("Ship Detection in Synthetic Aperture Radar Imagery", Proceedings OceanSAR—Third Workshop on Coastal and Marine Applications of SAR, St. John's, NL, Canada, Oct. 2006).*
Arnesen, T.N., Literature Review on Vessel Detection, FFI Rapport—2004/02619, Forsvarets Forskningsinstitutt, Kjeller, Norway.
Tunaley, J.K.E., Algorithms for Ship Detection and Tracking Using Satellite Imagery, Proc. 2004 International Geoscience and Remote Sensing Symposium (IGARSS 2004), IEEE., pp. 1804-1807.
Greidanus, H., Findings of the DECLIMS Project: Detection and Classification of Marine Traffic from Space, European Commission—Joint Research Centre, Proceedings of SEASAR 2006, Jan. 23-26, 2006.

(Continued)

*Primary Examiner* — Claire X Wang
*Assistant Examiner* — Shervin Nakhjavan
(74) *Attorney, Agent, or Firm* — Ryan J. Friedl; Kyle Eppele

(57) ABSTRACT

A method involves adapting a vessel detection algorithm based upon received synthetic aperture radar (SAR) image data and associated metadata, detecting one or more vessels within an image tile of the SAR image data by iteratively applying the adapted vessel detection algorithm to successive portions of the image tile, discarding a detected vessel if a false alarm is determined, extracting one or more features from the detected vessels that are not discarded, and generating one or more output products based upon the extracted features.

16 Claims, 11 Drawing Sheets

OTHER PUBLICATIONS

Eldhuset, K., Automatic Ship and Ship Wake Detection System for Spaceborne SAR Images from Coastal Regions, IEEE Trans. Geosci. Rem. Sensing, 34(4), pp. 1010-1019, Aug. 1988.

Meyer, F., Automatic Ship Detection in Spaceborne SAR Imagery, ISPRS Hannover Workshop 2009, High-Resolution Earth Imaging for Geospatial Information.

* cited by examiner

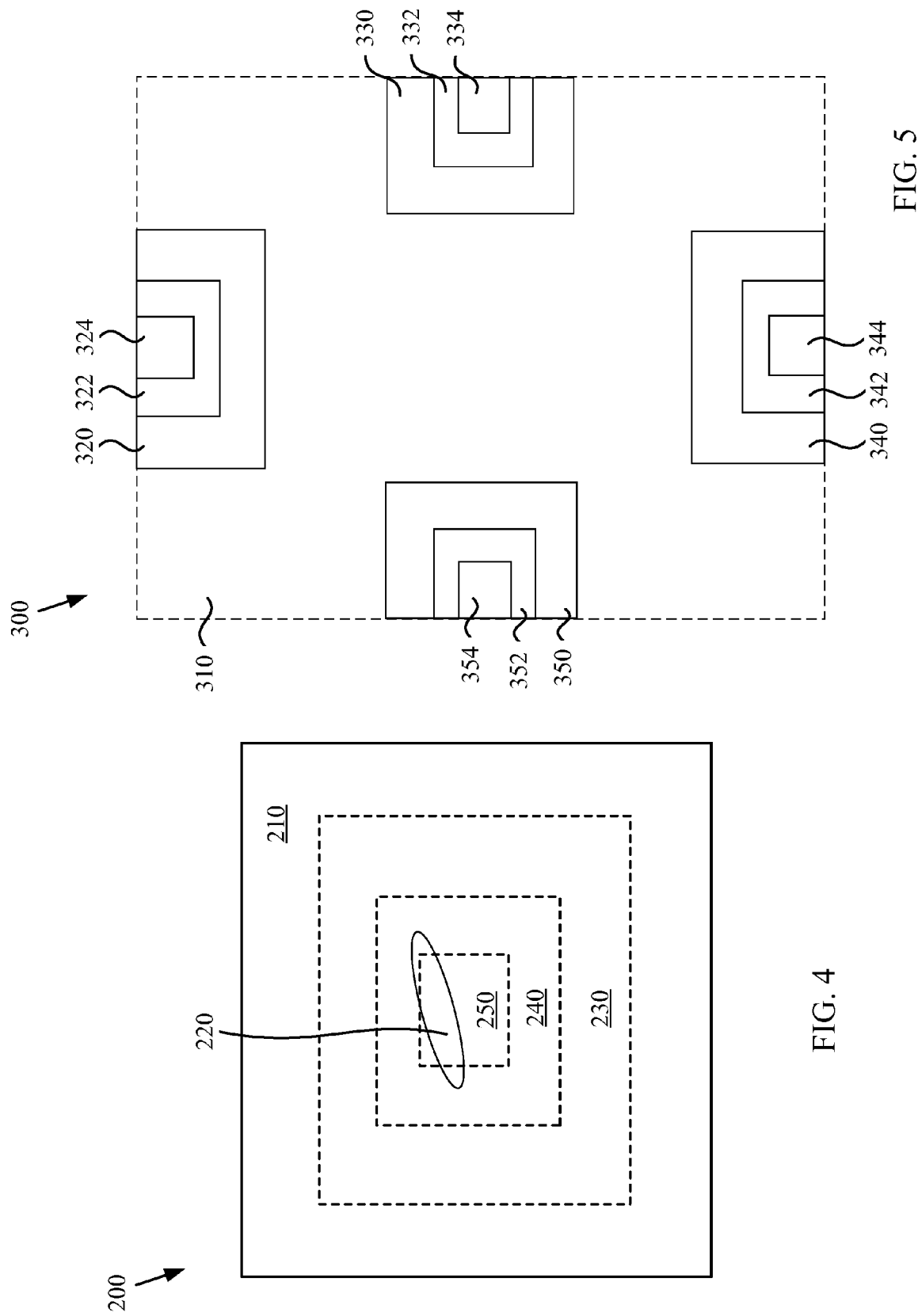

FIG. 11

ADAPTIVE AUTOMATED SYNTHETIC APERTURE RADAR VESSEL DETECTION METHOD WITH FALSE ALARM MITIGATION

CROSS-REFERENCE TO RELATED APPLICATIONS

This application is a continuation-in-part of U.S. patent application Ser. No. 12/197,421, filed on Aug. 25, 2008 now U.S. Pat. No. 8,116,522, entitled "Ship Detection Method and System From Overhead Images", the content of which is fully incorporated by reference herein.

FEDERALLY-SPONSORED RESEARCH AND DEVELOPMENT

The Adaptive Automated Synthetic Aperture Radar Vessel Detection Method with False Alarm Mitigation is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 100637.

BACKGROUND

Current Synthetic Aperture Radar (SAR) vessel detection systems are sensor-specific, resolution-specific, or imaging mode-specific. Also, no current vessel detection system provides all possible features for each detected vessel (i.e. length, width, heading, speed, etc). Such features allow the user to more accurately fuse automated SAR ship detection results with other sources of information based on ship type, length, width, etc, as well as to classify the possible type of vessel detected. A method is needed that can quickly and automatically detect all vessels in SAR imagery with minimal false alarms, extract relevant information about each vessel (length, width, heading, class), and accurately report these results to users.

BRIEF DESCRIPTION OF THE DRAWINGS

FIG. 4 shows a diagram of a background window, target window, and guard window used on an image to calculate a signal-to-clutter ratio.

FIG. 5 shows a diagram of a configuration for the background, guard, and target windows within an image tile to account for the windows being located at the edge of the image tile.

FIG. 11 shows another example of an HTML tip sheet output product produced using the Adaptive Automated Synthetic Aperture Radar Vessel Detection Method with False Alarm Mitigation, the tip sheet showing detected vessels and extracted features.

DETAILED DESCRIPTION OF SOME EMBODIMENTS

Figure 1:
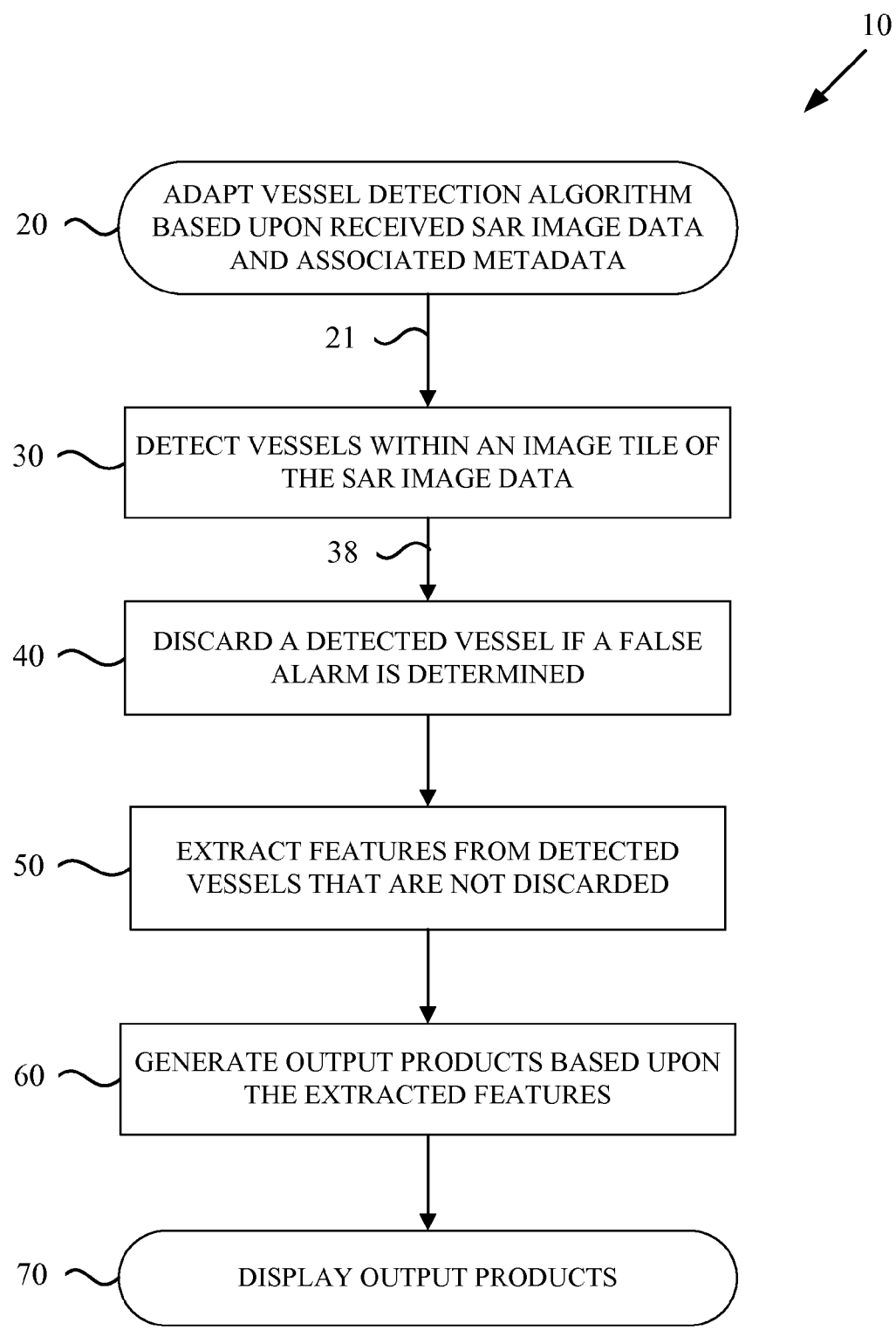
FIG. 1 shows a flowchart of an embodiment of a method in accordance with the Adaptive Automated Synthetic Aperture Radar Vessel Detection Method with False Alarm Mitigation.

The method disclosed herein may be used for the automated detection of vessels in SAR imagery collected by either space-born or air-born platforms. The method may involve steps including: reading imagery, chipping the image, reading imagery metadata, and quickly and automatically detecting all ships or man-made objects in the image. In addition to providing the location of each vessel detected, many features are extracted for each vessel, including length, width, heading, estimated radar cross-section, vessel speed, and vessel type or class. Each detection may be assigned a confidence based on estimated signal-to-clutter ratio (SCR) for that target, as well as the target length/width ratio, and a measure of how diffuse the target is (i.e. how many holes and bright spots are in the target). The detected ships may then be displayed on a range of output products, including Google Earth type KML files, shape files, and HTML tip sheets (tables of detects). These output products may be sent to users who can read these products directly or display them on a common operation picture (COP), such as GCCS-M. The method also detects and removes false alarms including azimuth ambiguities (ghosts), land, and low radar cross section (RCS) objects.

A main problem addressed by the method is the problem of quickly and automatically detecting all vessels in SAR imagery with minimal false alarms, extracting relevant information about each vessel (length, width, heading, class, and speed). The method further addresses the problem of reporting these results to users.

Although other ship detection systems exist, such systems have been developed to work best with only a few sensors. For example, one system has been developed and tested to detect vessels in SAR imagery almost exclusively with RADARSAT-1 and RADARSAT-2 data. Each sensor uses different hardware, which for example transmit different frequencies of radar energy, resulting in significant differences in the characteristics of the SAR imagery. RADARSAT-1 and RADARSAT-2 use C-band radars, and frequently collect dual or fully polarimetric data sets. Other sensors, such as TerraSAR-X, Tandem-X, and Cosmo SkyMED, use X-band radar. The method disclosed herein has been incorporated into a ship detection system that has been developed and tested with a wide range of sensors, including RADARSAT-1, RADARSAT-2, TerraSAR-X, ERS-2, ENVI ASAR, TEC-SAR, as well as a wide range of air-born SAR sensors.

Additionally, current systems have been developed to process only single polarizations. Modern SAR systems can provide up to four polarization channels simultaneously. A system and method designed to utilize all of these polarization channels provides significantly better ship detection than using only a single polarization channel. The method disclosed herein includes an algorithm for the processing quad polarized data which combines all available information. When dual polarized data is available, the method described herein selects the most appropriate polarization channel based on the incidence angle of the image.

Further, the disclosed method treats low resolution SAR modes, such as ScanSAR and StripMap mode, differently than higher resolution modes, such as Spotlight mode. Such features results in improved detection performance across a range of resolutions and imaging modes. Additionally, current systems have problems with false alarms. This includes detecting the same ship multiple times, detecting side lobes as ships, detecting unmasked land as a ship, and detecting azimuth anomalies (ghosts) as ships. The RAPIER SAR Ship Detection System contains algorithms that successfully combat each of these false alarm causes.

The Adaptive Automated Synthetic Aperture Radar Vessel Detection Method with False Alarm Mitigation may be incorporated into the RAPid Image Exploitation Resource (RAPIER) framework, which is a framework for the rapid development of automated target recognition algorithms. Some embodiments of the method incorporated into the RAPIER framework provide three main functionalities, including: 1) reading in images and applying the appropriate sensor models, 2) detecting all vessels in the imagery and extracting the features of the detected vessel, and 3) producing output products based upon the detected vessels and their extracted features.

Figure 2:
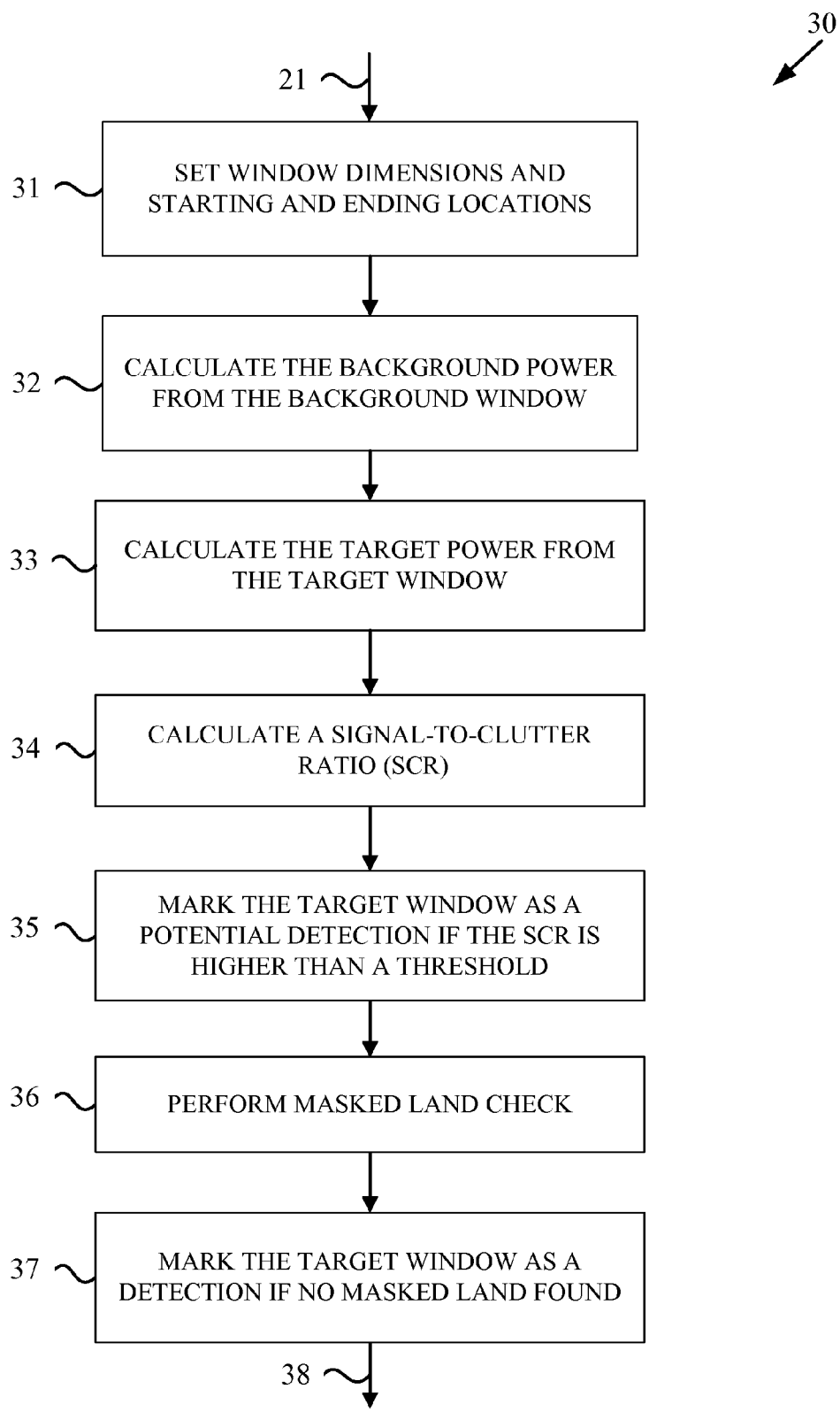
FIG. 2 shows a flowchart of an embodiment of a step for detecting vessels within an image tile of the SAR image data.

Referring to FIGS. 1 and 2, FIG. 1 shows a flowchart of an embodiment of a method 10 in accordance with the Adaptive Automated Synthetic Aperture Radar Vessel Detection Method with False Alarm Mitigation, while FIG. 2 shows one embodiment of a system 100 that may be used to implement method 10, such system including memory 110, a processor 120, and a display 130. As an example, some or all of the steps of method 10 may be performed by processor 120 in conjunction with memory 110, with step 70 further using display 130.

Method 10 may begin at step 20, which involves adapting a vessel detection algorithm based upon received SAR image data and associated metadata. Step 20 may include the step of reading in SAR data and the associated metadata. The metadata gives specific information regarding the sensor geometry and hardware configuration, which may be used to adapt detection algorithms. In some embodiments, the metadata includes one or more of the following: imaging mode, beams used, range and azimuth resolution, satellite height and velocity, local incidence angles, radar frequency, pulse repetition frequency, slant range, pass direction, look direction, local sensor noise estimates, radiometric corrections parameters, sensor, processing level, polarization channels available, ground control points, RPC coefficients, ephemeris data, image data and time.

After the SAR data and metadata is read in, a sensor model may be applied to adapt a vessel detection algorithm. In some embodiments, such adaptation depends upon the sensor and may be based upon rigorous models mapping image pixel coordinates to geodetic coordinates. If possible, radiometric correction is applied to remove effects due to sensor noise and local incidence angle on the measured brightness at the radar receiver.

More particularly, after the SAR data and metadata is read in, one of two detection algorithms is applied to the image. One algorithm may be applied for lower resolution SAR imagery based on a multi-stage constant false alarm rate (CFAR) detector. Another algorithm may be applied for higher resolution Spotlight mode imagery. In addition to choosing which algorithm will be applied, at this stage, detection parameters may be chosen based on the exact image mode, incidence angle, and resolution. At this stage, if quad polarized data is available, a statistical decision variable combining all four polarizations is found and passed onto the detection algorithm. If dual polarized data is available, the average incidence angle of the scene is found, and used to choose the optimal polarization channel.

Method 10 may then proceed along flow path 21 to step 30, which involves detecting one or more vessels within an image tile of the SAR image data by iteratively applying the adapted vessel detection algorithm to successive portions of the image tile. Prior to the detection, the image may be broken up into tiles of size 512×512, for example. Radiometric correction may then be applied to each tile. The tile image may then be input into whichever algorithm is appropriate based upon the image mode and resolution.

To apply radiometric correction to the image, the method may convert from digital values to sigma-naught corrected values. Such conversion may be performed by applying either a look-up table (in the case of RadarSAT-2), or a formula with values given in the metadata file (in the case of TerraSAR-X and RadarSAT-1). Radiometric correction compensates for variations within the image of incidence angle and noise. For large footprint images, such as ScanSAR mode images, this is desirable, as the local incidence angle varies considerably between near and far range, resulting in an apparent brightness gradient.

For lower resolution SAR imagery, an adaptive multi-stage CFAR algorithm is employed. Based upon the sensor, resolution, and incidence angle, window sizes, probability of detection, and probability of false alarm (Pd and Pfa) are set for each stage. The Pfa and Pd are set to determine a signal to clutter ratio (SCR) threshold factor, while a Rayleigh noise model is assumed. There are nominally three stages of detection, each with progressively smaller background, guard, and target windows. These three stages are performed over five sections of the image tile, including: the interior of the tile, and the four edges of the tile. The background and guard window dimensions must be adjusted at the edges so that the target window is butted up directly against the tile edge. Note that the edges of tiles are often ignored in other SAR ship detection software. To determine whether the pixels in the target window are background or ship, an adaptive threshold is applied to a calculated SCR.

Referring to FIG. 4, FIG. 4 shows a diagram 200 of a background window, target window, and guard window used on an image 210 to calculate an SCR. Image 210 may be a portion of an image having a vessel 220 therein. For example, image 210 may be a portion of image 310 shown in FIG. 5. FIG. 4 represents a fixed stage one embodiment of step 30. Step 30 may involve three stages, where, as the stages progress, the size of each of the background window 230, guard window 240, and target window 250 decreases. In the low resolution CFAR embodiments (in low resolution SAR images, ships are very nearly square in shape), target window size is configured to match the expected minimum width of a ship within a size range of vessels.

Because the method involves detection over several progressively smaller windows, additional adaptability in choosing target, background, and guard window sizes is provided. Such adaptability has the benefit of improving the speed of the algorithm, decreasing the number of false alarms, and increasing the probability of detection. Further, multiple stages of detection helps to eliminate false alarms due to side-lobes that generally appear in SAR imagery and extend from a vessel in both the along track and cross track dimensions. Additionally, the multiple stages of detection drastically improve the detection and false alarm rates by simultaneously increasing the number of small targets detected—particularly when the small target are tightly packed together, as in a harbor area—and decreasing the number of single ships that are detected multiple times.

For each stage of step 30, the power in the background window is first calculated at step 32. Only the pixels in between the guard window and the background window are used to calculate the power. Excluding all pixels inside the guard window provides a more accurate estimate of the true background power since it eliminates the presence of the ship in the target window from also lying in the background window. The background power (or clutter power) is calculated according to the equation $$\text{Clutter Power} = \text{mean}_{clutter} * \text{mean}_{clutter} + \text{std}_{clutter} * \text{std}_{clutter} \quad \text{(Eq. 1)}$$

where $\text{mean}_{clutter}$ is the mean of the pixels (or sigma naught values) in the background window and $\text{std}_{clutter}$ is the standard deviation of the pixels in the background window, excluding all pixels inside the guard window.

Following step 32, step 34 involves calculating the target power according to the equation $$\text{Target Power} = \text{mean}_{target} * \text{mean}_{target} \quad \text{(Eq. 2)}$$

Next, step 36 involves calculating an estimated SCR according to the equation $$\text{SCR} = \text{Target Power}/\text{Clutter Power} \quad \text{(Eq. 3)}$$

In some embodiments, the SCR may be calculated according to the equation $$\text{SCR} = 10 * \log 10[(\text{Avg. pwr. target window})/(\text{Avg. pwr. background window})] \quad \text{(Eq. 4)}$$

The calculated SCR is then compared to a SCR threshold, which may be based upon the particular detection stage, sensor, imaging mode, incidence angle, noise characteristics, polarization, and resolution. If the calculated SCR is higher than the threshold value, the target window is marked as a potential detection in step 37.

FIG. 5 shows a diagram 300 of a configuration for the background, guard, and target windows within an image tile 310 to account for the windows being located at the edge of the image tile. As shown in FIG. 5, image tile 310 contains four edges, with a background window 320, guard window 322, and target window 324 positioned at the top edge, a background window 330, guard window 332, and target window 334 positioned at the right edge, a background window 340, guard window 342, and target window 344 positioned at the bottom edge, and a background window 350, guard window 352, and target window 354 positioned at the left edge. The background and guard windows are adjusted at the edges of image tile 310 such that the target window is butted up to the edge of image tile 310. In other words, around the tile edges, the target windows are not truncated, but the background and guard windows are. Such a configuration is desired, as ships existing on the tile edge or cut in half between tiles would not otherwise be detected. The sliding target window routine is used for all of the image tile sections, with the difference being different starting and ending locations for the row and column sections are input into the routine and window adjustments are made.

Figure 6:
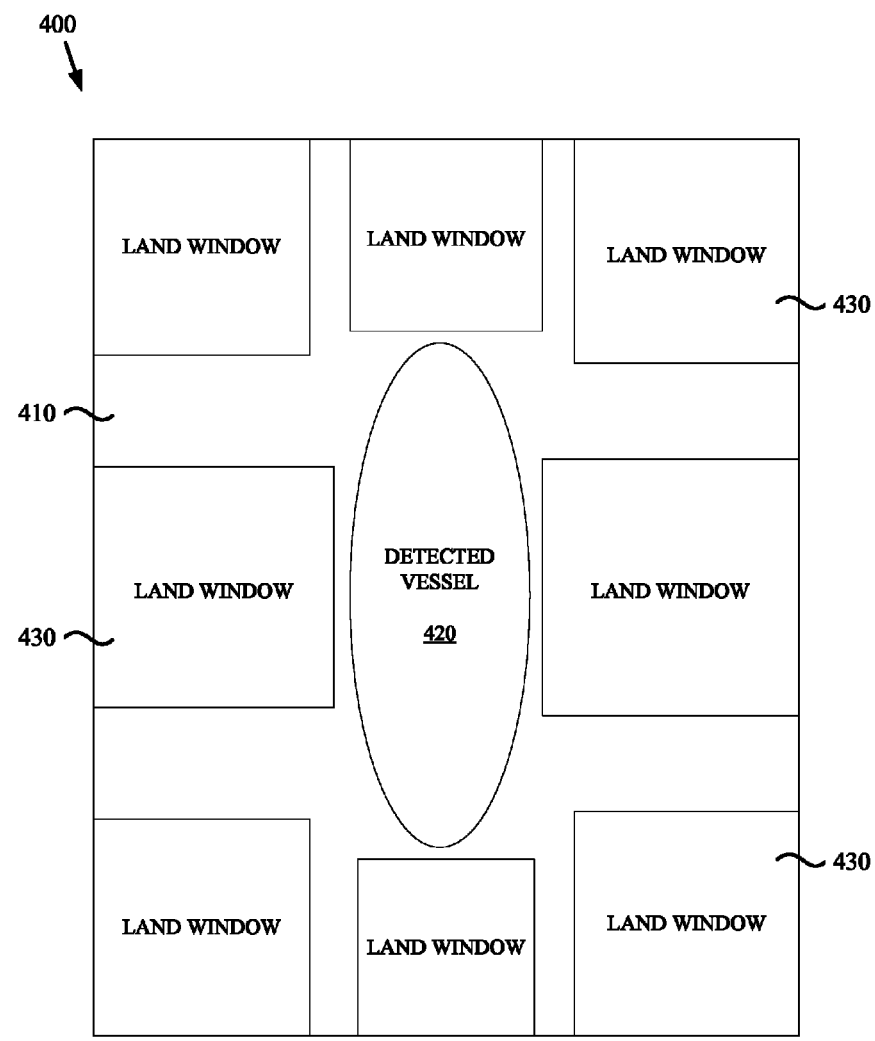
FIG. 6 shows a diagram of embodiment of an image tile configuration for masked land detection.

Once a potential detection is made, it is checked for masked land in the background window and for the presence of another previously detected ship in the target window. An embodiment of an image tile configuration for masked land detection is shown in diagram 400 of FIG. 6. The land detection example depicted in FIG. 6 is configured to only detect masked land. As shown in FIG. 6, an image tile 410 having a potentially detected vessel 420 therein, contains a series of 8 target-window-sized windows 430 termed "land windows" (except for along the tile edges, where only 5 land windows are used due to the smaller size of the background window along the tile edges). Land windows 430 are checked for having zero variance. A variance of zero occurs due to a land-masked portion of a tile, and does not occur naturally in SAR imagery.

Regarding the elimination of detection of the same ship multiple times, a Boolean array stores the detection information from all previous detection rounds of every pixel within the image tile. When a potential detection is made, every pixel within the guard window is checked to see if it was previously detected as a ship. If so, the current detection if discarded.

Following step 37, method 10 may proceed to step 40 along flow path 38. Step 40 involves discarding a detected vessel if one or more false alarms are determined. The false alarms may include a determination that a calculated radar cross-section (RCS) of the detected vessel exceeds a predetermined RCS threshold and a determination that the detected vessel is an azimuth ambiguity.

Figure 7:
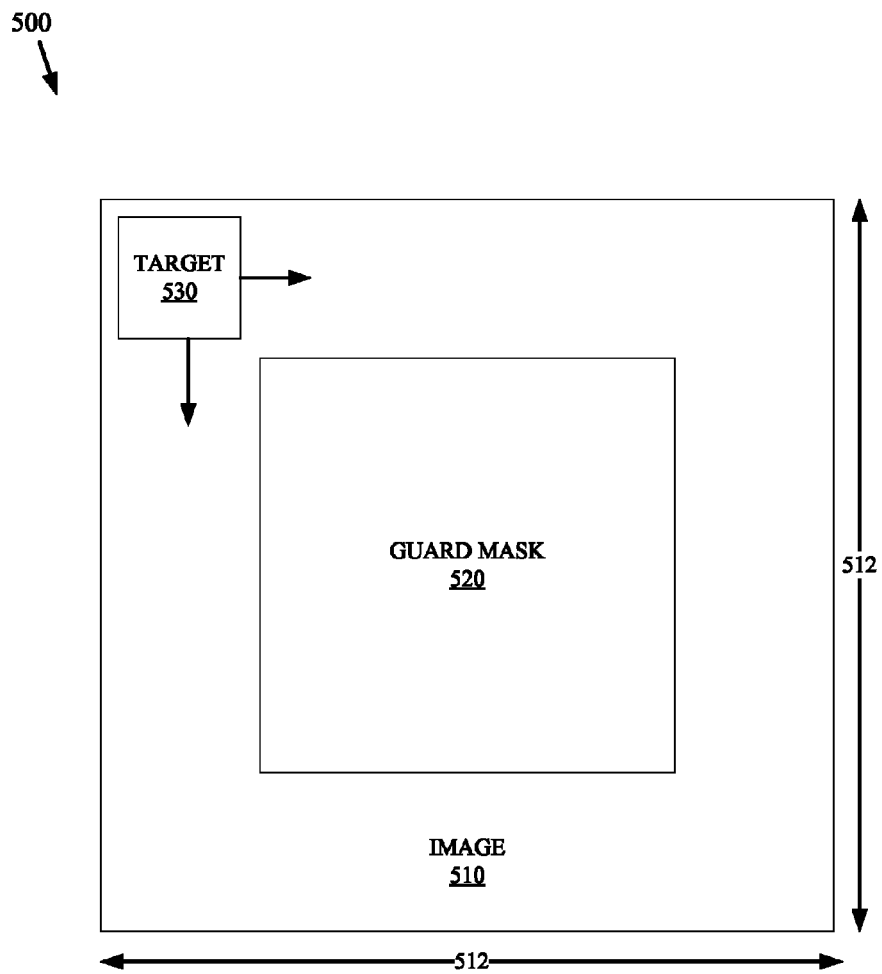
FIG. 7 shows a diagram of an embodiment of an image tile configuration for high-resolution detection.

For high-resolution SAR imagery, a different detection algorithm may be used which further minimizes the number of false alarms due to multiple detects on a single vessel. The high-resolution algorithm uses only a single round of detection which takes a ring of pixels along the outer edge of the tile to reduce computational costs, while still having a large sample size of pixels for making background noise calculations. A diagram 500 of an image tile configured for high-resolution detection is shown in FIG. 7. FIG. 7 includes an image 510, which, for example, measures 512 pixels by 512 pixels, a guard mask 520, and a target window 530. Target window 530 slides across the entire image 510, including the background annulus (between target window 530 and guard mask 520) where background statistics are calculated. Similar to the low resolution detection algorithm, the high-resolution algorithm has an adaptive threshold which is set based on the sensor and resolution. The target window size depends on the imaging mode and resolution.

The high-resolution imagery algorithm involves calculating the background power, which is calculated in the same manner as in the low-resolution detection algorithm. Next, as above, the target power is calculated in the same manner. The SCR is then estimated and compared to a threshold. If the SCR of the target window is higher than the threshold, a check for land is performed in a manner similar to that used for the low-resolution detection. If no land is present, the pixels in the target window are marked as detects and the algorithm moves on to the next window. Again, no pixels are marked as detections more than once.

After all of the vessels are detected, other false alarm removal algorithms may be employed. First, the radar cross section (RCS) of each vessel is calculated. If the RCS is below a threshold, the vessel is considered a false alarm and is removed. Next, using information about the sensor geometry, the expected distance between azimuth anomalies is calculated. Azimuth anomalies or ghosts occur along the azimuth direction in a low-resolution SAR image, periodically in both directions from the main detect, with decreasing strength.

Figure 8:
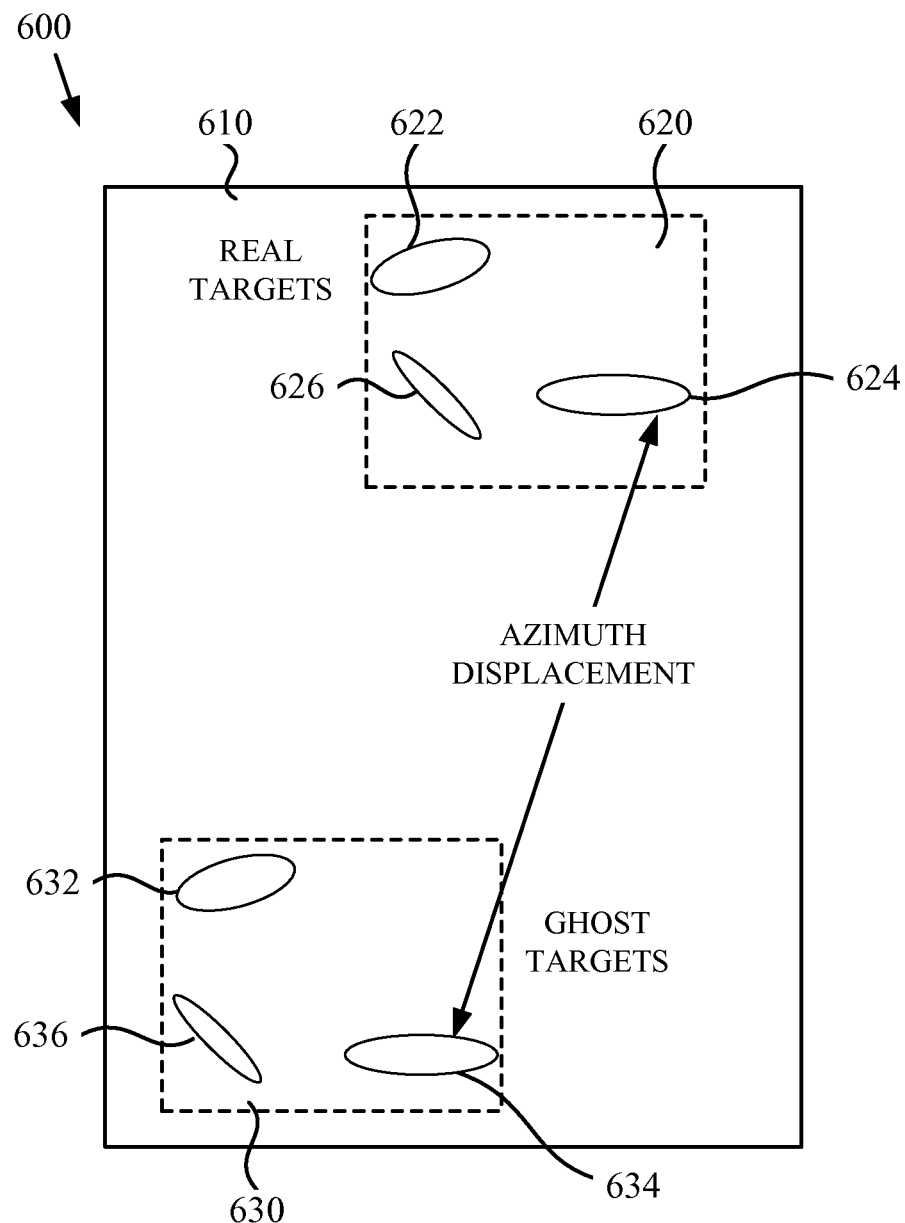
FIG. 8 shows a diagram illustrating the azimuth displacement between real targets and ghost targets detected by the method.

FIG. 8 shows a diagram 600 illustrating the azimuth displacement between real targets and ghost targets detected by the method. As shown, an image 610 may include a group 620 of real targets 622, 624, and 626 that are separated by a group 630 of ghost targets 632, 634, and 636 by an azimuth displacement represented by the arrow. The location of the group of ghost targets 630 with respect to the group of real targets 620 can be found according to $$\Delta y = \text{PRF} * (c/f_{center}) * R_s/(2*v) \quad \text{(Eq. 5)}$$

where PRF is the pulse repetition frequency, c is the speed of light in a vacuum, v is the satellite velocity, $R_s$, is the slant range, and $f_{center}$ is the center frequency of the radar pulse. The velocity of the satellite can be calculated as;

$$v = [(u/(R_e + h/1000)) * 1000]^{0.5} \quad \text{(Eq. 6)}$$

where u is the standard gravitational parameter, $R_e$ is the radius of the earth, and h is the height of the satellite. The expected location of the anomalies is then calculated in terms of pixels by normalizing Δy by the pixel size (in meters).

Once the location of expected anomalies is determined, the locations on either side of detected vessels are examined. If either ghost region (calculated expected azimuth ambiguity location) has a detection signal of a lower signal-to-noise ratio (SNR) than the detection signal at the location of the primary target vessel, it is considered a ghost and discarded. If either location has a target of higher SNR, then the detection signal of the primary target vessel is considered a ghost and is thrown away.

Figure 9:
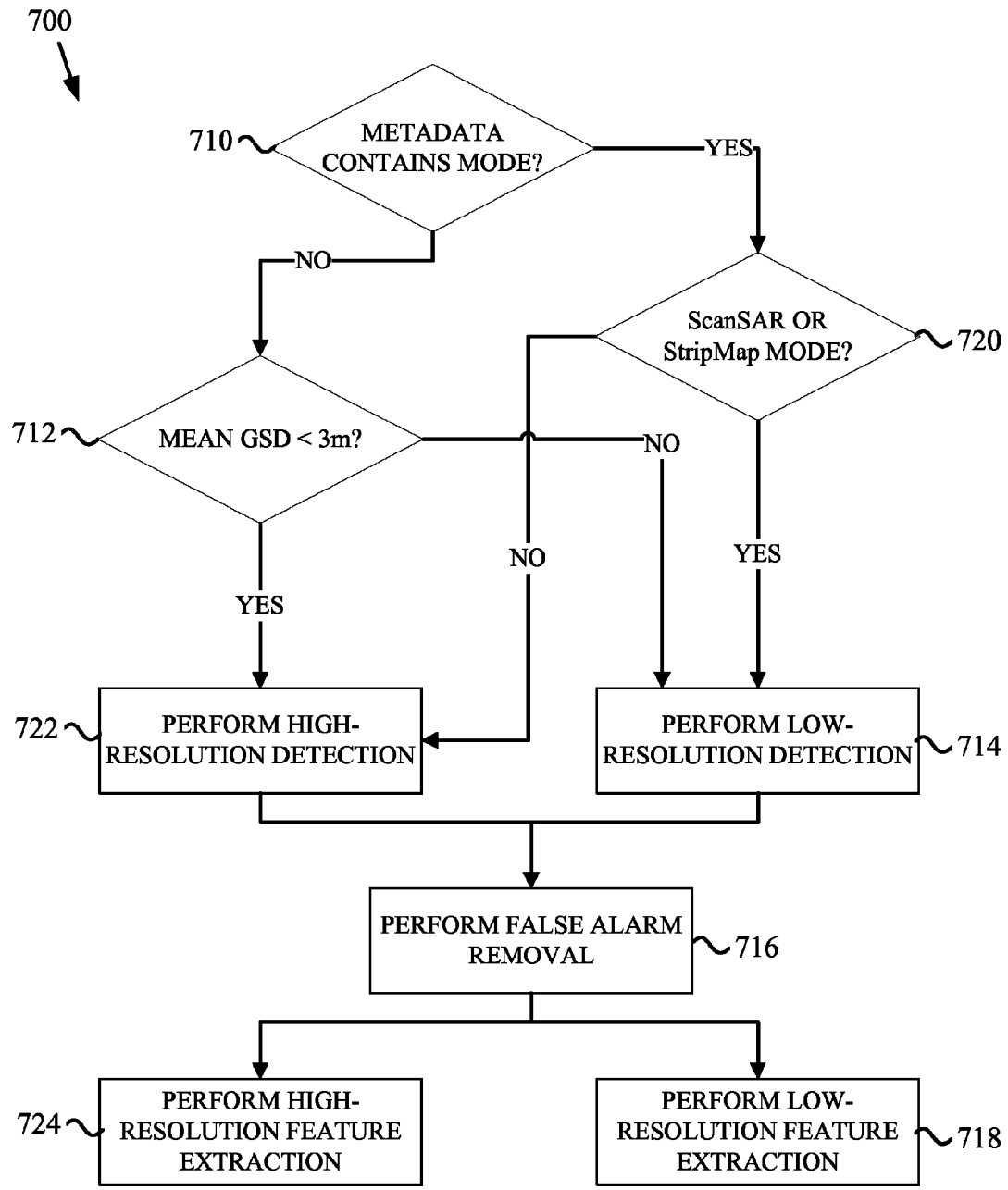
FIG. 9 shows a flow diagram of an embodiment of a method for feature extraction in accordance with the Adaptive Automated Synthetic Aperture Radar Vessel Detection Method with False Alarm Mitigation.

After all false alarms have been removed, step 50 involves extracting features from the detected vessels that have not been discarded. Depending on weather the detected vessels came from high resolution or low resolution imagery, one of two distinct feature extraction algorithms may be used. FIG. 9 shows a flowchart of a method 700 that may be used as an embodiment of step 50.

Method 700 may begin at step 710, where it is determined whether the metadata contains an image mode. If it doesn't, step 712 involves determining if a mean Ground Sample Distance (GSD) is less than 3 m. If so, step 722 involves performing a high-resolution detection. If not, step 714 involves performing a low-resolution CFAR detection. From both step 714 and 722, method 700 proceeds to step 716, which involves performing false alarm removal using techniques such as ghost detection and removal and low RCS false alarm removal. Following step 716, a low-resolution feature extraction is performed at step 718 if step 714 was performed, and a high-resolution feature extraction is performed at step 724 if a high-resolution detection was performed.

Referring back to step 710, if the metadata contains a mode, step 720 determines whether the mode is ScanSAR or StripMap mode. If one of ScanSAR or StripMap mode is detected, method 700 proceeds to step 714. If one of ScanSAR or StripMap mode is not detected, method 700 proceeds to step 722 where a high-resolution detection is performed. Following step 722, method 700 proceeds to step 716 for false alarm removal, after which, method 700 proceeds to step 724 for a high-resolution feature extraction.

For high resolution images, detections are merged, since there can be more than one detection corresponding to a single physical vessel. This merging process refers only to ships that have been broken into pieces due to the tiling process. In one version, the merging algorithm loops through all the detections and compares each detection with one another to determine if a particular detection overlapped another. The algorithm would then execute if there were n detections that overlapped for the merging algorithm to execute, with n being a positive number greater than one. The new corners for the merged detection would be calculated from the detections to be merged. Once this is complete, the length, width, and heading are found using the Radon transform of a threshold version of the vessel image. Classification is performed by extracting the RCS profile along the major axis of the detected vessel. This feature vector is then used to perform supervised classification. Models for known vessel classes have been derived from ground truth.

For low resolution images, length, width, and heading are found in the same way. In addition, for low resolution imagery, vessel speed is estimated by finding the wake associated with a detected vessel. This is done using the radon transform to find both dark and bright lines near the detected vessel. Once these lines are found, the start of the wake is found by performing linear least squares line fitting, and in the case of Kelvin wakes, finding the intersection of two lines (V wake). The range component of the distance between the start of the wake and the detected vessel is then used, along with sensor geometry parameters, to find the estimated vessel speed. Given the range distance between a vessel and it's corresponding wake, the associated vessel speed can be found according to;

$$V_{ship} = \Delta_x * \text{GSD}_x * v_{satellite}/(h_{satellite} * \tan(\theta_{incidence}) * \cos(\theta_{vessel})) \quad \text{(Eq. 7)}$$

where $\Delta_x$ is the distance in the range direction between the ship and its wake, $\text{GSD}_x$ is the ground sample distance in the range direction, $v_{satellite}$ is the velocity of the satellite, $h_{satellite}$ is the height of the satellite above the earth's surface, $\theta_{incidence}$ is the local incidence angle, and $\theta_{vessel}$ is the vessel heading. The calculated speed will be in meters/second. In low resolution images, no merging is done, and thresholding is done in an adaptive manner to obtain a binary image for the vessel image chip. For both low resolution and high resolution imagery, estimated RCS is found using sigma-naught radiometrically corrected data values.

Upon completion of either step 724 or step 718, the method may proceed to step 60 of method 10. Step 60 involves generating one or more output products based upon the extracted features. The method may involve generating one or more output products including an HTML tip sheet, a KMZ file, and a shape file.

Figure 10:
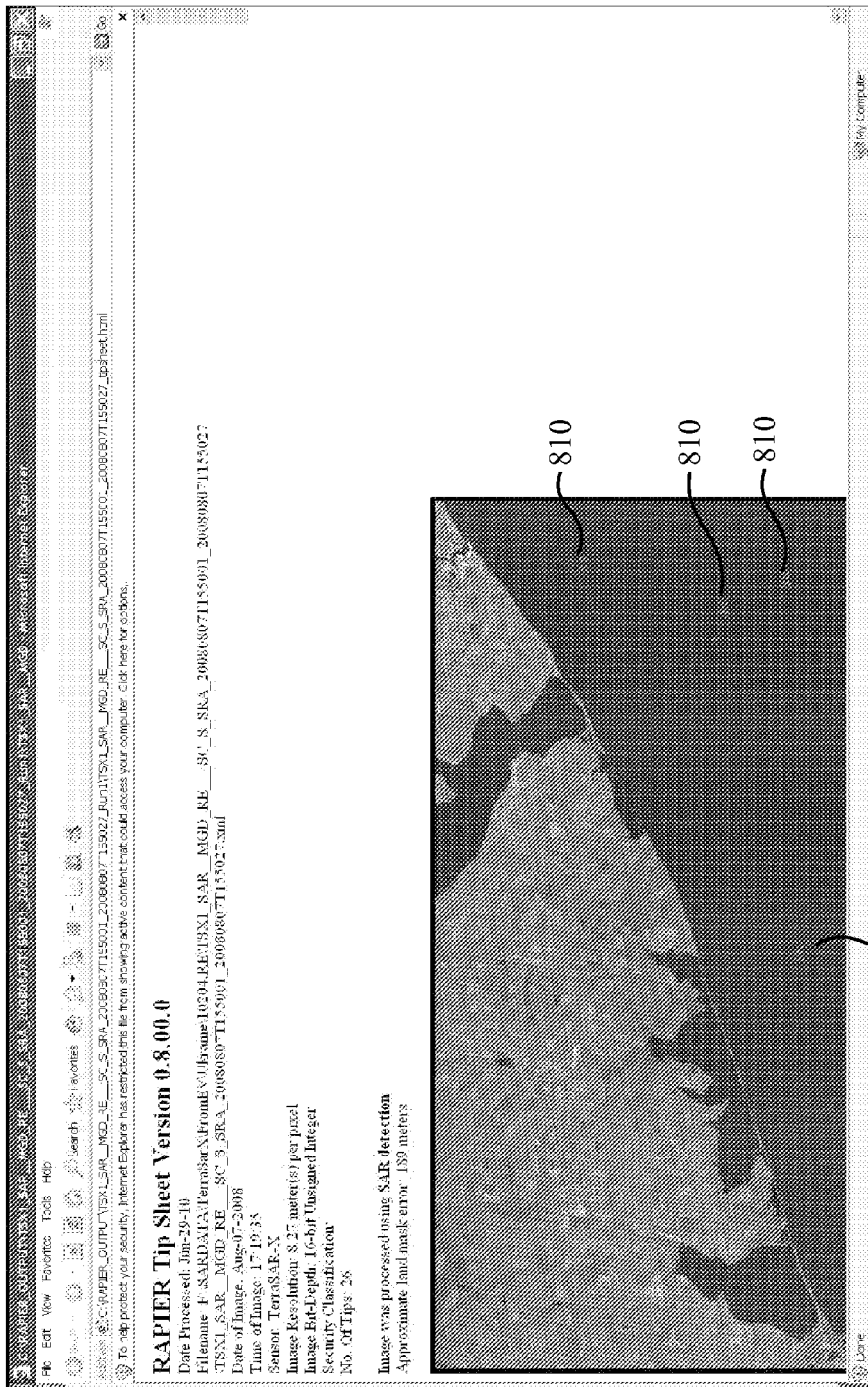
FIG. 10 shows an example of an HTML tip sheet output product produced using the Adaptive Automated Synthetic Aperture Radar Vessel Detection Method with False Alarm Mitigation, the tip sheet depicting metadata extracted from an image.

FIG. 10 shows an example of an HTML tip sheet 800. Tip sheet 800 can be viewed in any browser. Tip sheet 800 shows all detected vessels 810 for an image and displays metadata 820 extracted from the image. The extracted metadata may be displayed in a tabular format to allow a user to quickly scroll through and view the information. In some embodiments, a reduced resolution version of the original image may be included in tip sheet 800.

Figure 11:
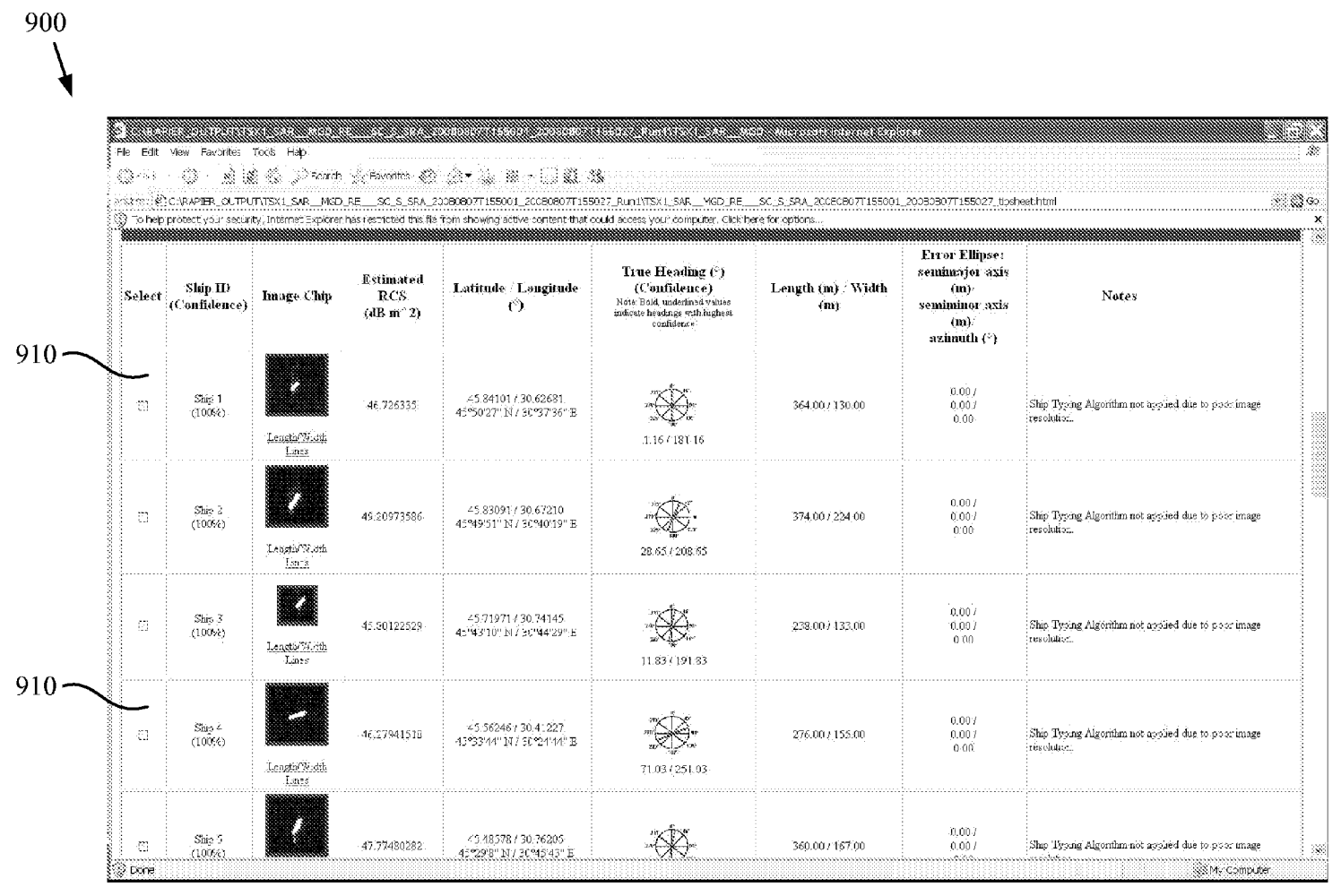

FIG. 11 shows another example of an HTML tip sheet 900 produced using method 10. The rows 910 of tip sheet 900 show extracted features for a particular detected vessel. The extracted features are displayed in the columns of tip sheet 900. The extracted features may include one or more of the following: ship ID and confidence level, image chip, estimated radar cross-section, latitude/longitude, true heading and confidence level, length and width, and error ellipse.

Figure 12:
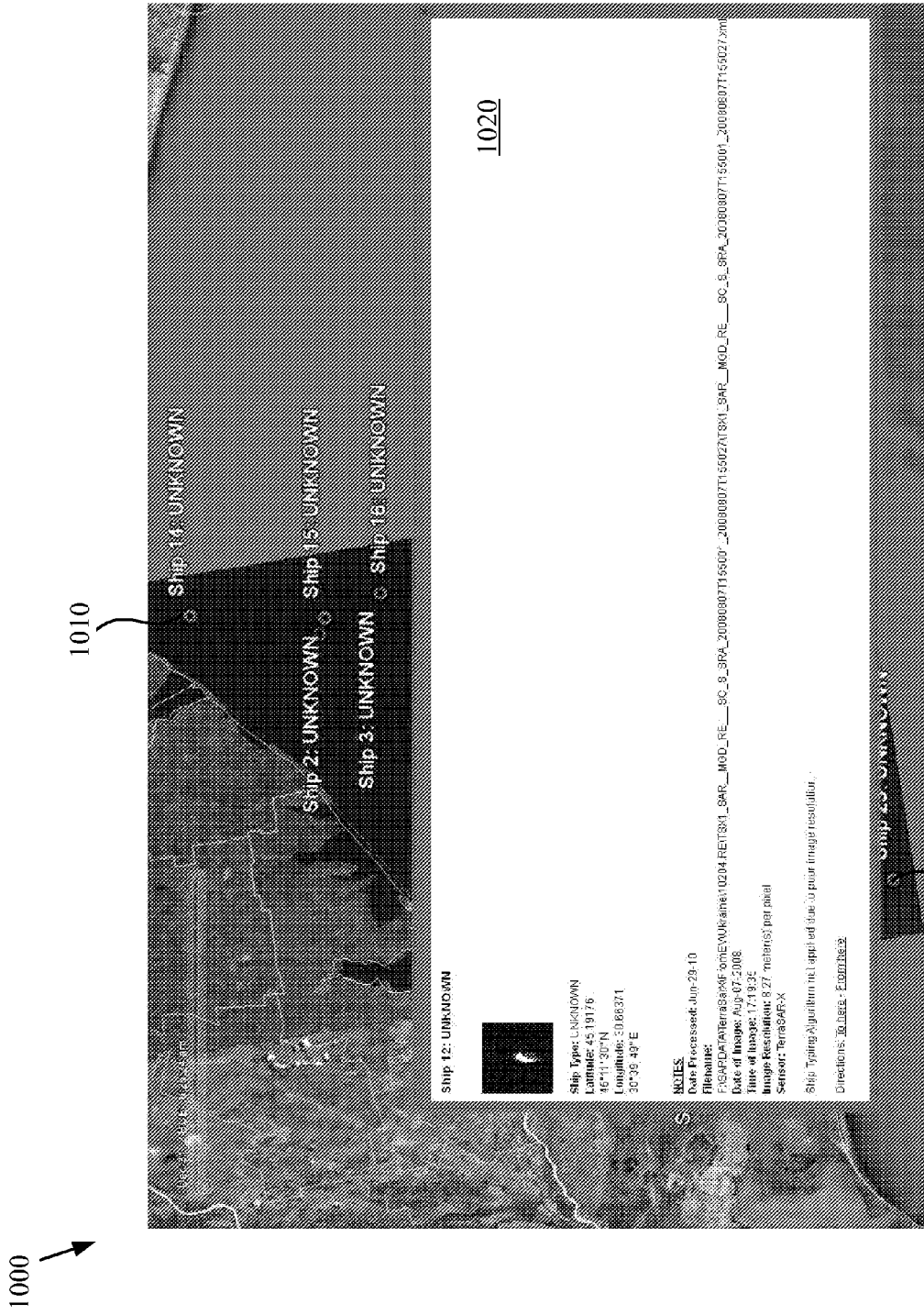
FIG. 12 shows a diagram of a KMZ output product produced using the Adaptive Automated Synthetic Aperture Radar Vessel Detection Method with False Alarm Mitigation.

FIG. 12 shows a diagram of a KMZ output product 1000 that may be produced in step 60 of method 10. The KMZ file contains all detected vessels 1010, which are plotted onto Google Earth. When a user selects a detected vessel, the extracted features for that vessel, as well as a reduced resolution version of the original image, may be displayed as an overlay 1020. The KMZ file is a zipped file with a .kmz extension that is used to distribute keyhole markup language (KML) files.

Figure 3:
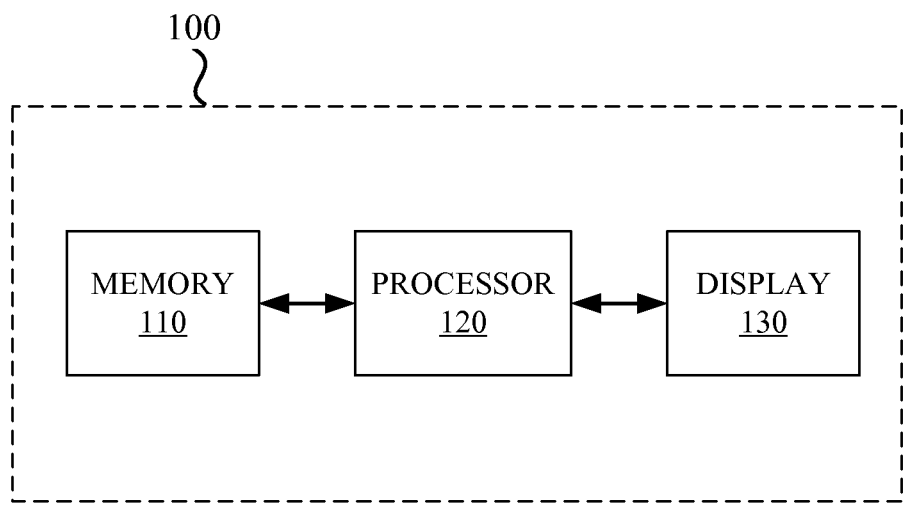
FIG. 3 shows a diagram of an embodiment of a system in accordance with the Adaptive Automated Synthetic Aperture Radar Vessel Detection Method with False Alarm Mitigation.

Step 60 may also involve generating other output products such as shape files, OTH-G files, RIT reports, and other files that may be of interest to specific users. The shape file (.shp)

is a vector file with an associated database file (.dbf) which has one entry for every detected vessel. This output can be overlaid on the original image or manipulated in programs such as ArcGIS. After the output products are generated in step 60, method 10 may then proceed to step 70, which involves displaying the output products on a display, such as display 130 in FIG. 3.

While the methodology and corresponding system may be used to detect all man-made vessels on the ocean surface in SAR imagery, the method and system may also be applied to the detection of other objects on the ocean surface such as oil slicks, icebergs, unmarked islands, and underwater man-made objects. These other applications would require some changes to the underlying detection algorithms.

Some or all of the steps of methods 10 and 700 may be stored on a computer-readable storage medium, such as a non-transitory computer-readable storage medium, wherein the steps are represented by computer readable programming code. The steps of methods 10 and 700 may also be computer-implemented using a programmable device, such as a computer-based system. Methods 10 and 700 may comprise instructions that, when loaded into a computer-based system, cause the system to execute the steps of methods 10 and 700. Methods 10 and 700 may be implemented using various programming languages, such as "Java", "C" or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the Adaptive Automated Synthetic Aperture Radar Vessel Detection Method with False Alarm Mitigation are possible in light of the above description. Within the scope of the appended claims, the embodiments of the method and system described herein may be practiced otherwise than as specifically described. The scope of the claims is not limited to the implementations and the embodiments disclosed herein, but extends to other implementations and embodiments as contemplated by a person having ordinary skill in the art.

We claim:

1. A computer-implemented method comprising the steps of:
    adapting a vessel detection algorithm based upon received synthetic aperture radar (SAR) image data and associated metadata by applying an adaptive constant false alarm rate (CFAR) algorithm to the vessel detection algorithm based upon a sensor type, an imaging mode, and an image resolution of the SAR image data;
    detecting one or more vessels within an image tile of the SAR image data by iteratively applying the adapted vessel detection algorithm to successive portions of the image tile; and
    discarding a detected vessel if one or more false alarms are determined, the false alarms including a determination that a calculated radar cross-section (RCS) of the detected vessel exceeds a predetermined RCS threshold and a determination that the detected vessel is an azimuth ambiguity.

2. The computer-implemented method of claim 1, wherein the associated metadata comprises at least one of imaging mode, beams used, range and azimuth resolution, satellite height and velocity, local incidence angles, radar frequency, and polarization of data.

3. The computer-implemented method of claim 1, wherein a multi-stage adaptive CFAR algorithm is applied if a Stripmap or ScanSAR imaging mode is used, and a single-stage high-resolution adaptive CFAR algorithm is applied if a Spotlight imaging mode is used.

4. The computer-implemented method of claim 3, wherein the multi-stage adaptive CFAR algorithm uses three detection stages and background, guard, and target windows, wherein the background, guard, and target windows are each reduced in size during each successive detection stage, wherein the background window and guard window sizes are adjusted when the target window abuts against an edge of the image tile.

5. The computer-implemented method of claim 4, wherein the step of detecting a vessel within an image tile of the SAR image data comprises the steps of:
    setting window dimensions and starting locations and ending locations for each window;
    calculating a target power based upon pixels in the target window;
    calculating a background power based on the pixels in the background window and excluding the pixels in the guard window;
    calculating a signal-to-clutter ratio (SCR); and
    marking the target window as a potential detection if the calculated SCR is higher than a predetermined SCR threshold, wherein the predetermined SCR threshold is based upon the imaging mode and a satellite type.

6. The computer-implemented method of claim 5 further comprising the step of, after marking the target window as a potential detection, recording the potential detection as a detection if masked land was not detected within the image tile and the vessel was not previously detected.

7. The computer-implemented method of claim 1, wherein if the image resolution is less than three meters, a detection algorithm having a single detection stage is applied, wherein single the detection stage calculates background statistics over a ring of pixels along the edge of the image tile.

8. The computer-implemented method of claim 1, wherein the determination that the detected vessel is an azimuth ambiguity comprises the steps of:
    calculating one or more expected azimuth ambiguity locations for each detected vessel; and
    determining if a detection signal at the one or more calculated expected azimuth ambiguity locations has a lower signal-to-noise ratio (SNR) than a detection signal at the location of the detected vessel.

9. The computer-implemented method of claim 8, wherein the one or more expected azimuth ambiguity locations are calculated according to the equation $\Delta y = PRF*(c/f_{center}*R_s/(2*v))$, where PRF is a pulse repetition frequency, c is the speed of light in a vacuum, v is a satellite velocity, $R_s$ is a slant range, and $f_{center}$ is the center frequency of a radar pulse, where the satellite velocity is calculated according to the equation $v=[(u/(R_e+h/1000))*1000]^{0.5}$, where u is the standard gravitational parameter, $R_e$ is the radius of the earth, and h is the height of the satellite.

10. The computer-implemented method of claim 8, wherein the step of discarding a detected comprises the steps of:
  discarding a detected vessel at a calculated expected azimuth ambiguity location if the detection signal at the calculated expected azimuth ambiguity location has a lower signal-to-noise ratio (SNR) than the detection signal at the location of the detected vessel; and
  discarding a detected vessel at the location of the detected vessel if the detection signal at the calculated expected azimuth ambiguity location has a higher signal-to-noise ratio (SNR) than the detection signal at the location of the detected vessel.

11. The computer-implemented method of claim 8 further comprising the steps of:
  extracting one or more features from the detected vessels that are not discarded; and
  generating one or more output products based upon the extracted features.

12. The computer-implemented method of claim 1, wherein the step of detecting one or more vessels includes a determination that masked land was not detected within the image tile and the vessel was not previously detected.

13. A computer-implemented method comprising the steps of:
  adapting a vessel detection algorithm based upon received synthetic aperture radar (SAR) image data and associated metadata;
  detecting one or more vessels within an image tile of the SAR image data by iteratively applying the adapted vessel detection algorithm to successive portions of the image tile;
  determining that a detected vessel is an azimuth ambiguity by calculating one or more expected azimuth ambiguity locations for each detected vessel and determining if a detection signal at the one or more calculated expected azimuth ambiguity locations has a lower signal-to-noise ratio (SNR) than a detection signal at the location of the detected vessel; and
  discarding a detected vessel determined to be an azimuth ambiguity.

14. The computer-implemented method of claim 13, wherein the step of discarding a detected vessel determined to be an azimuth ambiguity comprises the steps of:
  discarding a detected vessel at a calculated expected azimuth ambiguity location if the detection signal at the calculated expected azimuth ambiguity location has a lower signal-to-noise ratio (SNR) than the detection signal at the location of the detected vessel; and
  discarding a detected vessel at the location of the detected vessel if the detection signal at the calculated expected azimuth ambiguity location has a higher signal-to-noise ratio (SNR) than the detection signal at the location of the detected vessel.

15. The computer-implemented method of claim 13 further comprising the steps of:
  extracting one or more features from the detected vessels that are not discarded; and
  generating one or more output products based upon the extracted features.

16. A system comprising:
  a display;
  a processor operatively connected to the display; and
  a memory module operatively connected to the processor, the memory module having program instructions stored therein, wherein the program instructions are executable by the processor to perform a method comprising the steps of:
    adapting a vessel detection algorithm based upon received synthetic aperture radar (SAR) image data and associated metadata by applying an adaptive constant false alarm rate (CFAR) algorithm to the vessel detection algorithm based upon a sensor type, an imaging mode, and an image resolution of the SAR image data,
    detecting one or more vessels within an image tile of the SAR image data by iteratively applying the adapted vessel detection algorithm to successive portions of the image tile,
    discarding a detected vessel if one or more false alarms are determined, the false alarms including a determination that a calculated radar cross-section (RCS) of the detected vessel exceeds a predetermined RCS threshold and a determination that the detected vessel is an azimuth ambiguity,
    extracting one or more features from the detected vessels that are not discarded,
    generating one or more output products based upon the extracted features, and
    displaying the output products on the display.

\* \* \* \* \*